Patented June 17, 1952

2,600,387

UNITED STATES PATENT OFFICE 2,600,387

CARBOXYALKYLATION OF KETONIC COMPOUNDS

Warren L. Beears, Cleveland, Ohio, assignor to The B. F. Goodrich Company, New York, N. Y., a corporation of New York No Drawing. Application June 28, 1950, Serial No. 170,957

7 Claims. (Cl. 260—483)

This invention relates to a method for the carboxyalkylation of various ketonic compounds, and pertains more particularly to a carboxyalkylation process wherein a saturated aliphatic beta-lactone is reacted with a ketonic compound having at least one reactive hydrogen atom attached to the carbon atom which is in turn connected to carbonyl groups, the reaction being carried out in aqueous solution and in the presence of an alkali metal hydroxide or an alkaline earth metal hydroxide catalyst.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolacetone (also called hydracrylic acid lactone) which has the structure

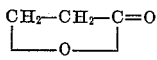

is economically obtained from ketene and formaldehyde. The case with which beta-lactones are now obtained makes it desirable to use these compounds as starting materials in the synthesis of many valuable compounds, including carboxylated ketones and the like.

It is disclosed in a copending application, Serial No. 169,793 filed June 22, 1950, that certain keonic compounds containing one or more active hydrogen atoms attached to a carbon atom contiguous to two carbonyl groups react with beta-lactones in the presence of an alkali metal catalyst and under substantially anhydrous conditions in such a manner that at least one of the active hydrogen atoms is replaced by a carboxyalkyl radical.

It has now been discovered that saturated aliphatic beta-lactones also react in aqueous solution and in the presence of an alkali metal hydroxide or alkaline earth metal hydroxide, with compounds of the structure

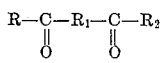

wherein R is a hydrocarbon such as an alkyl, aryl or cycloalkyl radical, R₁ is an alkylidene radical in which at least one reactive hydrogen atom is attached to the carbon atom contiguous to the carbonyl carbon atoms of the ketonic compound and R₂ is a hydrocarbon or alkoxy radical. This reaction proceeds in such a manner that the beta carbon atom of the beta-lactone attaches to the reactive hydrogen-bearing carbon atom of the ketonic compound to form a carbon to carbon linkage, the resulting products, after acidification of the reaction mixture, being carboxyalkylated ketonic compounds of the structure

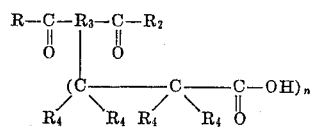

wherein R and R₂ have the same meaning as above, R₃ is the radical derived by removing reactive hydrogen from the alkylidene radical R₁ of the starting ketonic compound, each R₄ is a member of the class consisting of hydrogen and lower alkyl radicals and n is a whole number greater than 0 but less than 3. It is to be understood, of course, that when the reactive hydrogen containing carbon atom of the ketonic compound contains two active hydrogens, they may both be replaced by carboxyalkyl radicals. The overall reaction of this invention may be depicted structurally as follows:

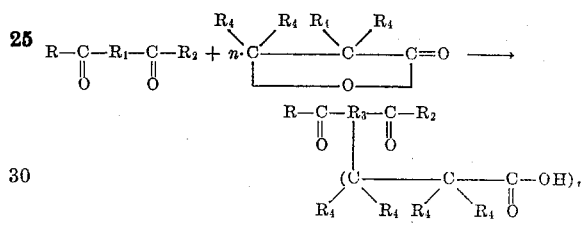

wherein R, R₁, R₂, R₃ and R₄ have the same significance as above. This reaction is unique in that it occurs in water while condensations of ketonic compounds of the type shown above are ordinarily carried out in alcohol solution. The reaction is also unique in that it represents one of the first examples of a reaction of a beta-lactone with a compound containing carbon bound active hydrogens in such a way that a carbon to carbon linkage is formed.

Typical ketonic compounds possessing the structure shown hereinabove and which react with beta-lactones in accordance with this invention include methyl acetoacetate, ethyl acetoacetate, propyl acetoacetate, isopropyl acetoacetate, butyl acetoacetate, amyl acetoacetate and the like, methyl propioacetate, ethyl propioacetate, butyl propioacetate, ethyl butyroacetate, propyl butyroacetate, butyl butyroacetate, hexyl butyroacetate, methyl valeroacetate, alpha-acetyl butyl propionate, alpha-acetyl ethyl butyrate, alpha-propionyl methyl propionate, alpha-acetyl ethyl valerate and the like; acetyl acetone, propionyl acetone, butyryl acetone, caproyl acetone, ethyl acetomethyl ketone, butyl propiomethyl ketone, hexyl butyromethyl ketone, ethyl alpha-aceto-ethyl ketone, benzoylacetone, benzoylmethyl ethyl ketone, benzoyl acetophenone, acetyl-methyl cyclohexyl ketone, acetylmethyl allyl ketone, naphthoylacetone and the like.

It is to be understood, of course, that the above compounds are merely illustrative of the above-defined class of ketonic compounds which contain one or more reactive hydrogen atoms and which will therefore react with beta-lactones in accordance with the present invention, for the nature of the hydrocarbon groups or the alkoxy group is not a critical factor. In general, however, it is desired that the radicals R and $R_1$ contain from 1 to 6 carbon atoms.

The beta-lactones which are reacted with ketones in accordance with this invention are saturated aliphatic beta-lactones which possess the structure

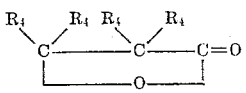

as represented in the above equation, wherein each $R_4$ is a member of the class consisting of hydrogen and lower alkyl radicals, preferably containing from 1 to 4 carbon atoms. Typical examples of such beta-lactones include in addition to beta-propiolactone, beta-butyrolactone, beta - isobutyrolactone, beta - n - valerolactone, beta - isovalerolactone, beta-isopropyl-beta-propionlactone, beta-ethyl-beta-butyrolactone, alpha-methyl-beta-propiolactone, alpha, alpha-dimethyl beta-propiolactone, and the like. Especially preferred beta-lactones for use in this process are beta-propiolactone and other beta-lactones which are water-soluble; beta-lactones containing from 3 to 6 carbon atoms possess this property.

Any of the alkali metal hydroxides or alkaline earth metal hydroxides may be used as catalysts in the present process. Such hydroxides include sodium hydroxide, lithium hydroxide, potassium hydroxide, rubidium hydroxide, cesium hydroxide, calcium hydroxide, strontium hydroxide, barium hydroxide and the like. The quantity of catalyst utilized is not critical and may be varied considerably. In general, however, it may be stated that it is desirable to utilize from 0.5 to 2.0 moles of the alkali metal for each mole of the carbonyl compound, although smaller or larger amounts may be utilized if desired.

The quantity of the beta-lactone utilized is likewise not critical. Accordingly, the lactone and the carbonyl compound may be brought together in equimolar quantities in which event one reactive hydrogen atom will be replaced by a carboxyalkyl radical, or if desired an excess of the lactone may be employed, in which event at least a portion of the product will consist of a ketonic compound in which two reactive hydrogen atoms, if present, are replaced by carboxyalkyl radicals. It has been found that the optimum ratio of the ketonic compound to beta-lactone to alkali metal is approximately 1:1:1 although other ratios may also be used without seriously affecting the yield of desired product.

Generally, the reaction of the present invention is carried out at temperatures in the range of about 0° C. to 50° C. However, temperatures below 0° C. and higher than 50° C. are also operative although the yields obtained are not so high as those obtained when the preferred temperatures are employed.

The following specific examples are intended to illustrate more fully the process of this invention, but are not intended to be construed as limiting the scope thereof, for there are, of course, numerous possible variations and modifications. In the examples all parts are by weight.

*Example I*

80 parts (2 moles) of sodium hydroxide are dissolved in 800 parts of water and the solution is cooled to about 15° C. 260 parts (2 moles) of ethyl acetoacetate are then added to the solution with vigorous stirring and cooling whereupon a voluminous white precipitate forms. 144 parts (2 moles) of beta-propiolactone are added over a period of about 15 minutes the temperature being maintained at 15° C. to 30° C. The reaction mixture is then allowed to digest for one hour after which the reaction mixture is acidified with concentrated hydrochloric acid. The reaction mixture is extracted with ether and the ether fraction distilled at reduced pressure to give forefractions consisting of ether and unreacted ethyl acetoacetate, and as the third fraction the desired product, 4-carbethoxy-5-oxocaproic acid. The yield is 34.4%.

*Example II*

Example I is repeated except that calcium hydroxide is substituted for the sodium hydroxide. A 26% yield of 4-carbethoxy-5-oxocaproic acid is obtained.

*Example III*

Example I is repeated except that 4 moles of ethyl acetoacetate, 4 moles of sodium hydroxide and 1 mole of beta-propiolactone are utilized and the temperature is maintained at 0° C. to 27° C. during the course of the reaction. The yield of 4-carbethoxy-5-oxocaproic acid is 55.4% of theoretical.

*Example IV*

100 parts (2.5 moles) of sodium hydroxide are dissolved in 800 parts of water. The resulting solution is cooled to 25° C. and 300 parts (3 moles) of acetylacetone are added with stirring and cooling to a temperature below 25° C. 144 parts of beta-propiolactone are added over a period of 1 hour during which the temperature is maintained at 23° to 26° C. After which the reaction mixture is cooled and acidified with hydrochloric acid. The acidified solution is extracted 3 times with ether and the ether fractions combined and distilled. Forefractions comprising ether, water and unreacted acetylacetone are obtained. The principal fraction, 142 parts (41.5%), consists of 4-acetyl-5-oxocaproic acid which on recrystallization from a mixture of benzene and hexane, melts at 73°–76° C. Analysis:

| | Calculated for $C_8H_{12}O_4$ | Found |
|---|---|---|
| C | 55.81 | 55.91 |
| H | 6.98 | 7.12 |
| Neut. Equiv. | 172 | 170 |

Its structure is verified by hydrolysis to the known 5-oxocaproic acid and acetic acid.

*Example V*

40 parts of sodium hydroxide are dissolved in 500 parts of water. To this solution 100 parts (0.61 mole) of benzoylacetone are added with constant stirring. 72 parts (1 mole) of beta-propiolactone are then added rapidly while maintaining the temperature of the reaction mixture at 25° to 35° C. The unreacted benzoylacetone is removed by filtering and the remainder of the reaction mixture acidified with hydrochloric acid and extracted with ether. The ether fraction is extracted with sodium bicarbonate solution and the resulting aqueous solution acidified whereupon a white precipitate forms. The gamma-acetyl gamma benzoyl butyric acid which forms deacetylates to gamma-benzoylbutyric acid, (M. P. 128°–130° C.; literature value 130°–132° C.).

*Example VI*

2 moles of ethyl acetoacetate and 2 moles of beta-butyrolactone are reacted in the presence of 2 moles of aqueous sodium hydroxide according to the method of Example I. 66 parts of the compound having the structure

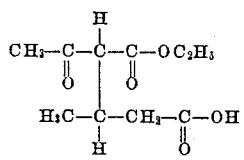

are obtained.

Moreover, when the above examples are repeated utilizing other of the ketonic compounds disclosed hereinabove, for example, propyl acetoacetate, butyl acetoacetate, amyl acetoacetate, benzoyl acetophenone, and the like, other carboxyalkylated ketonic compounds are again obtained in good yield.

The carboxyalkylated products prepared by the method of this invention are quite valuable compounds. For example, they are useful as intermediates in the preparation of esters, amides, amines and the like and for other purposes.

While specific embodiments of the invention have been disclosed herein, it is not intended to limit the invention solely thereto, for it is obvious that many modifications including substituting equivalent materials and varying the proportions of materials used are within the spirit and scope of the invention as defined in the appended claims.

I claim:

1. The method which comprises bringing together in aqueous solution and in the presence of a catalyst selected from the class consisting of the alkali metal hydroxides and alkaline earth metal hydroxides, a saturated aliphatic beta-lactone and a carbonyl containing compound of the formula

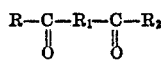

wherein R is a lower alkyl radical, $R_1$ is a lower alkylidene radical in which at least one reactive hydrogen atom is attached to the carbon atom contiguous to the carbonyl carbon atoms of the ketonic compound and $R_2$ is a member of the class consisting of hydrocarbon and alkoxy radicals and then acidifying the reaction mixture thereby to produce a compound in which at least one of said reactive hydrogen atoms of said carbonyl containing compound is replaced by a carboxyalkyl radical.

2. The method which comprises bringing together in aqueous solution and in the presence of a catalyst selected from the class consisting of the alkali metal hydroxides and the alkaline earth metal hydroxides, beta-propiolactone and a carbonyl containing compound of the formula

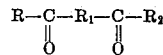

wherein R is a lower alkyl radical, $R_1$ is a lower alkylidene radical in which at least one reactive hydrogen atom is attached to the carbon atom contiguous to the carbonyl carbon atoms of the ketonic compound and $R_2$ is a member of the class consisting of hydrocarbon and alkoxy radicals and then acidifying the reaction mixture thereby to produce a compound in which at least one of said reactive hydrogen atoms of said carbonyl containing compound is replaced by a carboxyethyl radical.

3. The method which comprises bringing together in aqueous solution and in the presence of a catalyst selected from the class consisting of the alkali metal hydroxides and the alkaline earth metal hydroxides beta-propiolactone and a carbonyl containing compound of the formula

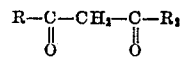

wherein R is an alkyl radical containing from 1 to 6 carbon atoms and $R_2$ is a member of the class consisting of hydrocarbon and alkoxy radicals containing from 1 to 6 carbon atoms, and then acidifying the reaction mixture, thereby to produce a compound in which at least one of said reactive hydrogen atoms of said carbonyl containing compound is replaced by a carboxyethyl radical.

4. The method which comprises bringing together in aqueous solution and in the presence of a catalyst selected from the class consisting of the alkali metal hydroxides and the alkaline earth metal hydroxides, beta-propiolactone and a carbonyl containing compound of the formula

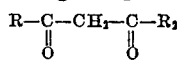

wherein R is an alkyl radical and $R_2$ is a hydrocarbon radical, and then acidifying the reaction mixture, thereby to produce a compound in which at least one of said reactive hydrogen atoms of said carbonyl containing compound is replaced by a carboxyethyl radical.

5. The method of claim 4 wherein the carbonyl containing compound is acetylactone, the compound obtained being 4-acetyl-5-oxocaproic acid.

6. The method which comprises bringing together in the presence of a catalyst selected from the class consisting of the alkali metal hyroxides and the alkaline earth metal hydroxides, beta-propiolactone and a carbonyl containing compound of the formula

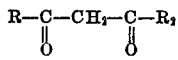

wherein R is an alkyl radical and $R_2$ is an alkoxy radical, and then acidifying the reaction mixture, thereby to produce a compound in which at least one of said reactive hydrogen atoms of said carbonyl containing compound is replaced by a carboxyethyl radical.

7. The method of claim 6 wherein the carbonyl containing compound is ethyl acetoacetate, the compound obtained being 4-carbethoxy-5-oxocaproic acid.

WARREN L. BEEARS.

No references cited.